United States Patent [19]

Tsujimoto

[11] Patent Number: 5,313,411
[45] Date of Patent: May 17, 1994

[54] ADAPTIVE RECEIVER CAPABLE OF ACHIEVING BOTH OF MATCHED FILTERING FUNCTION AND CARRIER RECOVERY FUNCTION

[75] Inventor: Ichiro Tsujimoto, Tokyo, Japan
[73] Assignee: NEC Corporation, Japan
[21] Appl. No.: 22,137
[22] Filed: Feb. 25, 1993
[30] Foreign Application Priority Data Feb. 26, 1992 [JP] Japan .................................. 4-039767

[51] Int. Cl.$^5$ .............................................. G06F 15/31
[52] U.S. Cl. ............................. 364/724.19; 364/724.11
[58] Field of Search ...................... 364/724.19, 724.20, 364/724.11, 724.01, 724.16

[56]  References Cited

U.S. PATENT DOCUMENTS 5,247,470  9/1993  McKown et al. ............... 364/724.11

OTHER PUBLICATIONS

K. Pahlavan et al., "Performance of Adaptive Matched Filter Receivers Over Fading Multipath Channels", IEEE Trans. on Communications, vol. 38, No. 12, Dec. 1990, pp. 2106-2113.

B. Widrow et al., "Adaptive Signal Processing", 1985, published by Prentice-Hall, Inc., pp. 99-115.

Primary Examiner—Long T. Nguyen
Attorney, Agent, or Firm—Laff, Whitesel, Conte, Saret

[57]  ABSTRACT

In an adaptive receiver comprising a primary transversal filter for filtering an input signal into a filtered signal in accordance with a plurality of tap coefficients and a decision-feedback equalizer for producing an equalized signal as a decision signal in response to the filtered signal, a secondary transversal filter processes the decision signal in accordance with a polar coordinate LMS (least mean square) algorithm and produces a plurality of tap coefficient signals representative of the plurality of tap coefficients.

3 Claims, 6 Drawing Sheets

FIG.5
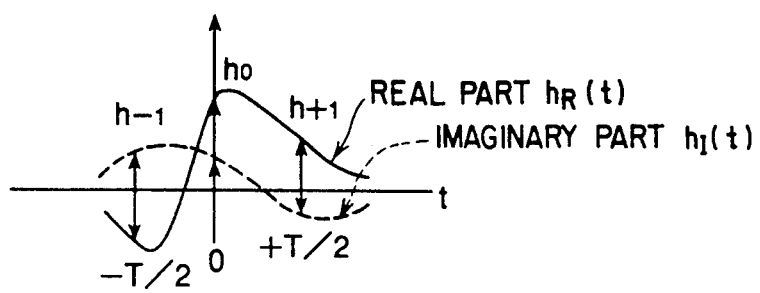
FIG.6(a)  FIG.6(b)  FIG.6(c)
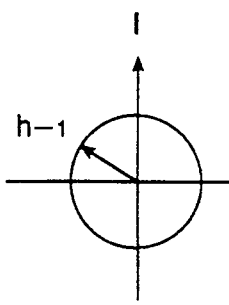 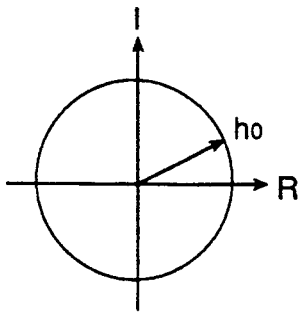 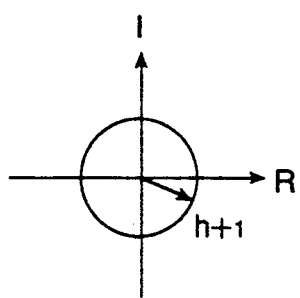
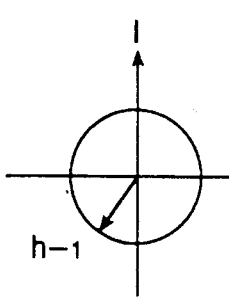 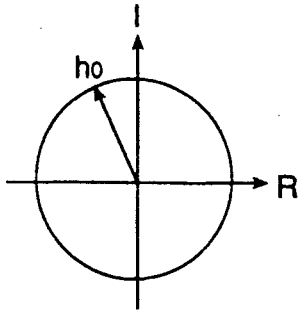 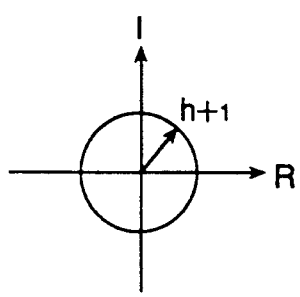
FIG.6(d)  FIG.6(e)  FIG.6(f)

ADAPTIVE RECEIVER CAPABLE OF ACHIEVING BOTH OF MATCHED FILTERING FUNCTION AND CARRIER RECOVERY FUNCTION

BACKGROUND OF THE INVENTION

This invention relates to an adaptive receiver for use in reducing waveform distortion caused by fading occurred in multipath channels.

Various types of adaptive receiver have been studied for a variety of fading multipath channels. As typical examples of the adaptive receiver, first and second types are well known in the art. The first type is that utilizes an MMSE (minimum mean square error) method while the second type is that utilizes a correlation method.

The adaptive receiver of the first type comprises a primary transversal filter which is called a matched filter, a decision-feedback equalizer, and a secondary transversal filter which is called a replica filter. The matched filter filters an input signal received through a transmission channel in accordance with a plurality of tap coefficients and delivers a primary filtered signal to the decision-feedback equalizer. The decision-feedback equalizer carries out equalization operation and produces an equalized signal as a decision signal. The decision signal is supplied to the replica filter. The replica filter is for estimating an impulse response of the transmission channel by the use of an error signal and the decision signal and produces a replica signal representative of replica of the input signal.

For this purpose, the input signal is supplied to a difference calculator through an input delay circuit as a delayed input signal. The difference calculator calculates a difference between the delayed input signal and the replica signal and delivers a difference signal representative of the difference to the replica filter as the error signal. In the replica filter, adaptation is carried out by minimizing a mean square value of the difference, namely, an error. As a result of execution of the MMSE method, the replica filter further delivers a plurality of tap coefficient signals representative of the plurality of tap coefficients to the matched filter.

The adaptive receiver of the second type comprises the matched filter and the decision-feedback equalizer which are similar to those described above. The second type adaptive receiver further comprises another type of secondary transversal filter in place of the replica filter. The other type secondary transversal filter comprises a correlation unit. The other type secondary transversal filter is for obtaining complex conjugate of a time reversal impulse response of the transmission channel and carries out correlation operation by the use of the input signal and the decision signal. As a result of the correlation operation, the other type secondary transversal filter delivers a plurality of tap coefficient signals representative of the plurality of tap coefficients to the matched filter.

As apparent from the above description, although the first type adaptive receiver has construction different from that of the second type adaptive receiver, the first type is equivalent to the second type in principle. The first and the second type have the same characteristics, such as a tap coefficient divergence characteristic. This point is disclosed in an article contributed by Kaveh Pahlavan and James W. Matthews to IEEE Transactions on Communications. Vol. 38, No. 12 (December 1990), pages 2106 to 2113, under the title of "Performance of Adaptive Matched Filter Receivers Over Fading Multipath Channels".

As will later become clear, both the first and the second types of the adaptive receiver are not suitable for low symbol rate transmission. This is because matched filtering function by the matched filter and carrier recovery function become difficult to exist together as a transmission symbol rate becomes low.

SUMMARY OF THE INVENTION

It is therefore an object of this invention to provide an adaptive receiver which is capable of achieving both of matched filtering function and carrier recovery function even if a transmission symbol rate becomes low.

It is another object of this invention to provide the adaptive receiver which is capable of reducing a background noise relative to a conventional adaptive receiver.

Other object of this invention will become clear as the description proceeds.

On describing the gist of an aspect of this invention, it is possible to understand that an adaptive receiver comprises a matched filter for filtering an input signal into a primary filtered signal in accordance with a plurality of tap coefficients, a decision-feedback equalizer connected to the matched filter for producing a decision signal in response to said primary filtered signal, producing means connected to the decision-feedback equalizer and supplied with an error signal for processing the decision signal by the use of the error signal in accordance with a polar coordinate LMS (least mean square) algorithm to produce a replica signal representative of replica of the input signal and a plurality of tap coefficient signals representative of the plurality of tap coefficients, an input delay circuit supplied with the input signal for giving a predetermined delay to the input signal to produce a delayed input signal having the predetermined delay, a difference calculator connected to the input delay circuit and the processing means for calculating a difference between the delayed input signal and the replica signal to produce a difference signal representative of the difference. The difference signal is defined by orthogonal coordinates. The adaptive receiver further comprises a difference signal converting circuit connected to the difference calculator for carrying out polar coordinate conversion to convert the difference signal defined by the orthogonal coordinates into a converted difference signal defined by polar coordinates. The converted difference signal is supplied to the processing means as the error signal.

BRIEF DESCRIPTION OF THE DRAWING

FIG. 5 is an illustration for use in describing an impulse response of a transmission channel;

FIGS. 6($a$), 6($b$), 6($c$), 6($d$), 6($e$) and 6($f$) are illustrations for use in describing a vector locus of the impulse response illustrated in FIG. 5.

DESCRIPTION OF THE PREFERRED EMBODIMENTS

Figure 1:
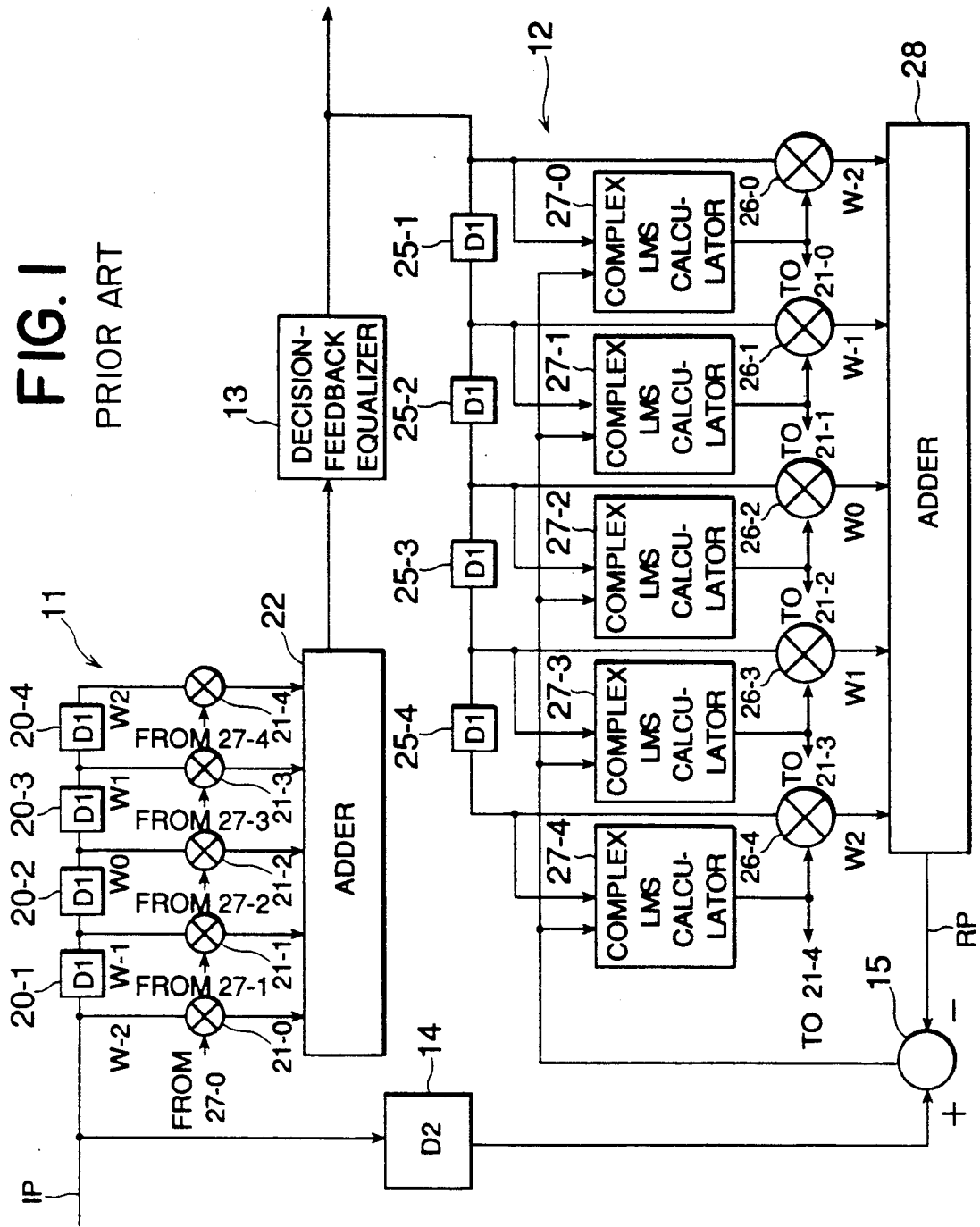
FIG. 1 shows a block diagram for use in describing a first type of conventional adaptive receiver.

Referring to FIG. 1, a first type of a conventional adaptive receiver will be described in order to facilitate an understanding of this invention. The adaptive receiver is of the type which utilizes MMSE (minimum mean square error) method. The adaptive receiver receives an input signal IP through a transmission channel. The adaptive receiver comprises a primary transversal filter 11, a secondary transversal filter 12, a decision-feedback equalizer 13, an input delay circuit 14, and a difference calculator 15. Each of the primary and the secondary transversal filters 11 and 12 has zeroth through N-th taps where N represents a positive integer greater than unity. In the example being illustrated, the positive integer N is equal to four. Accordingly, the primary and the secondary transversal filters 11 and 12 have zeroth through fourth taps.

The primary transversal filter 11 is for filtering the input signal IP into a primary filtered signal in accordance with zeroth through fourth tap coefficients which are depicted at $W_{-2}$, $W_{-1}$, $W_0$, $W_1$, $W_2$, respectively, and which correspond to the zeroth through the fourth taps, respectively. The primary transversal filter 11 comprises first through N-th primary delay circuits which are connected in series and zeroth through N-th primary complex multipliers. In the example, first through fourth primary delay circuits 20-1, 20-2, 20-3, and 20-4 and zeroth through fourth primary complex multipliers 21-0, 21-1, 21-2, 21-3, and 21-4 are illustrated because the positive integer N is equal to four. Each of the first through the fourth primary delay circuits 20-1 to 20-4 gives a first delay D1 to a signal supplied thereto. The first through the fourth primary delay circuits 20-1 to 20-4 successively provide the above-mentioned delays to supply first through fourth primary delayed signals to the first through the fourth primary complex multipliers 21-1 to 21-4, respectively. The first through the fourth primary delayed signals have first through fourth delays D1, 2D1, 3D1, and 4D1, respectively. The zeroth primary complex multiplier 21-0 is directly supplied with the input signal IP.

In the manner which will later be described, the zeroth through the fourth primary complex multipliers 21-0 to 21-4 are further supplied with zeroth through fourth tap coefficient signals which represent the zeroth through the fourth tap coefficients $W_{-2}$ to $W_2$, respectively. The zeroth primary complex multiplier 21-0 multiplies the input signal IP by the zeroth tap coefficient signal and produces a zeroth primary multiplied signal. The first primary complex multiplier 21-1 multiplies the first primary delayed signal by the first tap coefficient signal and produces a first primary multiplied signal. Similarly, the second through the fourth primary complex multipliers 21-2 to 21-4 multiply the second through the fourth primary delayed signals by the second through the fourth tap coefficients signals respectively, and produce second through fourth primary multiplied signals. The zeroth through the fourth primary multiplied signals are supplied to a primary adder 22. The primary adder 22 calculates a primary total sum of the zeroth through the fourth primary multiplied signals and delivers a primary sum signal representative of the primary total sum as the primary filtered signal. In addition, the first through the fourth primary delay circuits 20-1 to 20-4 may collectively be called a primary delay unit while the zeroth through the fourth primary complex multipliers 21-0 to 21-4 may collectively be called a primary complex multiplier unit. The primary transversal filter 11 may be called a matched filter.

In the manner known in the art, the decision-feedback equalizer 13 carries out equalization operation in response to the primary filtered signal and produces an equalized signal as a decision signal. The decision signal is supplied to the secondary transversal filter 12.

The secondary transversal filter 12 is for estimating an impulse response of the transmission channel by the use of the decision signal and an error signal which will shortly be described. In other words, the secondary transversal filter 12 minimizes a mean square value of the error signal. The secondary transversal filter 12 produces a replica signal RP, as a secondary filtered signal, representative of replica of the input signal IP. Therefore, the secondary transversal filter 12 may be called a replica filter.

By the way, it requires a predetermined duration until the replica signal RP is derived from the input signal IP. Under the circumstances, the input delay circuit 14 gives a second delay D2 equal to the predetermined duration to the input signal IP and delivers a delayed input signal having the second delay D2 to the difference calculator 15. The difference calculator 15 is further supplied with the replica signal RP from the secondary transversal filter 12. The difference calculator 15 calculates a difference between the delayed input signal and the replica signal RP and produces a difference signals representative of the difference. The difference signal is supplied to the secondary transversal filter 12 as the error signal.

The secondary transversal filter 12 comprises a plurality of secondary delay circuits which are equal, in number, to the primary delay circuits mentioned above and a plurality of secondary complex multipliers which are equal, in number, to the primary complex multipliers mentioned before. Therefore, first through fourth secondary delay circuits 25-1, 25-2, 25-3, and 25-4 and zeroth through fourth secondary complex multipliers 26-0, 26-1, 26-2, 26-3, and 26-4 are illustrated. Each of the first through the fourth secondary delay circuits 25-1 to 25-4 gives the first delay D1 to a signal supplied thereto. The first through the fourth secondary delay circuits 25-1 to 25-4 successively supply first through fourth secondary delayed signals to the first through the fourth secondary complex multipliers 26-1 to 26-4, respectively. The first through the fourth secondary delayed signals have the first through the fourth delays D1, 2D1, 3D1, and 4D1, respectively, and may be called first through fourth delayed decision signals, respectively. The zeroth secondary complex multiplier 26-0 is directly supplied with the decision signal. Let a second secondary delayed signal be represented by $\bar{a}_t$ at a certain time instant t. The third and the fourth secondary delayed signals are represented by $\bar{a}_{t-1}$ and $\bar{a}_{t-2}$, respectively, while the first secondary delayed signal and the descision signal are represented by $\bar{a}_{t+1}$ and $\bar{a}_{t+2}$, respectively.

The secondary transversal filter 12 further comprises zeroth through fourth complex LMS (least mean square) calculators 27-0, 27-1, 27-2, 27-3, and 27-4. Each of the zeroth through the fourth complex LMS calculators 27-0 to 27-4 is for carrying out complex LMS calculation based on a complex LMS algorithm known in the art. In other words, each of the zeroth through the fourth complex LMS calculators 27-0 to 27-4 carries out tap coefficient correction. For example, the zeroth complex LMS calculator 27-0 carries out the tap coefficient correction by the use of the decision signal and the error signal and produces a zeroth tap coefficient signal representative of the zeroth tap coefficient $W_{-2}$. Generally speaking, the tap coefficient correction is carried out in each of reception symbols in accordance with a first equation (1) given by;

$$W_i^{t+1} = W_i^t - \mu \epsilon^t \bar{a}_i^t. \tag{1}$$

In this event, $W_i^t$ represents an i-th tap coefficient produced by an i-th complex LMS calculator at the certain time instant t where i represents a variable between unity and N, both inclusive, $\mu$ represents a correction coefficient (a step size), $\epsilon^t$ represents an error represented by the error signal at the certain time instant t, and $\bar{a}_i^t$ represents a signal value, at the certain time instant t, of an i-th secondary delayed signal supplied to the i-th complex LMS calculator.

As a result of the tap coefficient correction mentioned above, the zeroth through the fourth complex LMS calculators 27-0 to 27-4 deliver the zeroth through the fourth tap coefficient signals to the zeroth through the fourth secondary complex multipliers 26-0 to 26-4, respectively. Supplied with the decision signal and the zeroth tap coefficient signal, the zeroth secondary complex multiplier 26-0 multiplies the decision signal by the zeroth tap coefficient signal and produces a zeroth secondary multiplied signal. The first secondary complex multiplier 26-1 is supplied with the first secondary delayed signal and the first tap coefficient signal and multiplies the first secondary delayed signal by the first tap coefficient signal to produces a first secondary multiplied signal. Likewise, the second through the fourth secondary complex multipliers 26-2 to 26-4 multiply the second through the fourth secondary delayed signals by the second through the fourth tap coefficient signals, respectively, and produce second through fourth secondary multiplied signals, respectively. The zeroth through the fourth secondary multiplied signals are supplied to a secondary adder 28. The secondary adder 28 calculates a secondary total sum of the zeroth through the fourth secondary multiplied signals and delivers a secondary sum signal representative of the secondary total sum to the difference calculator 15 as the replica signal RP.

Figure 2:
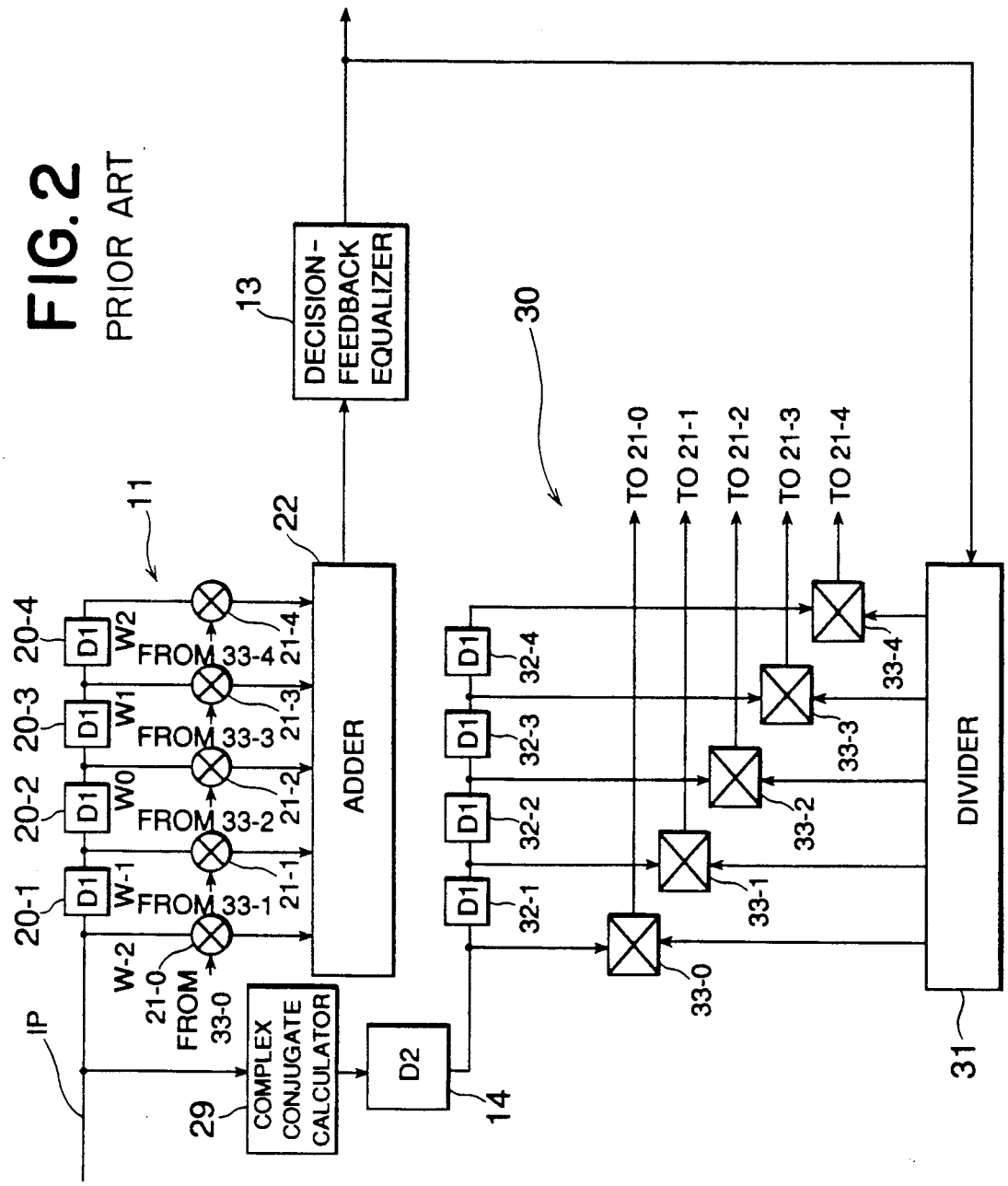
FIG. 2 shows a block diagram of a second type of conventional adaptive receiver.

Turning to FIG. 2, the description will proceed to a second type of a conventional adaptive receiver. The adaptive receiver is of the type which utilizes a correlation method. The adaptive receiver is similar to that illustrated in FIG. 1 except that a complex conjugate calculator 29 is utilized and that another type of a secondary transversal filter 30 is utilized in place of the secondary transversal filter 12. Therefore, the description concerning the primary transversal filter 11 is omitted.

The complex conjugate calculator 29 is supplied with the input signal IP and calculates complex conjugate of the input signal IP. The complex conjugate calculator 29 delivers a calculated input signal representative of the complex conjugate to the input delay circuit 14. The input delay circuit 14 gives the second delay D2 to the calculated input signal and supplies a delayed input signal having the second delay D2 to the secondary transversal filter 30.

The secondary transversal filter 30 is for obtaining the complex conjugate of a time reversal impulse response of the transmission channel. For this purpose, the secondary transversal filter 30 comprises a divider 31, first through fourth secondary delay circuits 32-1, 32-2, 32-3, and 32-4, and zeroth through fourth correlators 33-0, 33-1, 33-2, 33-3, and 33-4. The divider 31 divides the decision signal delivered from the decision-feedback equalizer 13 into zeroth through fourth divided signals and supplies the zeroth through the fourth divided signals to the zeroth through the fourth correlators 33-0 to 33-4, respectively. Each of the first through the fourth secondary delay circuits 32-1 to 32-4 gives the first delay D1 to a signal supplied thereto. The first through the fourth secondary delay circuits 32-1 to 32-4 successively supply first through fourth secondary delayed signals to the first through the fourth correlators 33-1 to 33-4, respectively. The zeroth correlator 33-0 is directly supplied with the delayed input signal.

The zeroth correlator 33-0 is for calculating a zeroth correlation coefficient between the delayed input signal and the zeroth divided signal. The zeroth correlation coefficient is equivalent to the zeroth tap coefficient $W_{-2}$ mentioned in conjunction with FIG. 1. The zeroth correlator 33-0 supplies a zeroth correlation signal representative of the zeroth correlation coefficient, as the zeroth tap coefficient signal, to the zeroth primary complex multiplier 21-0 in the primary transversal filter 11. Similarly, the first correlator 33-1 calculates a first correlation coefficient between the first secondary delayed signal and the first divided signal. The first correlation coefficient is equivalent to the first tap coefficient $W_{-1}$. The first correlator 33-1 delivers a first correlation signal representative of the first correlation coefficient, as the first tap coefficient signal, to the first primary complex multiplier 21-1. The second through the fourth correlators 33-2 to 33-4 calculate second through fourth correlation coefficients between the second through the fourth secondary delayed signals and the second through the fourth divided signals, respectively. The second through the fourth correlators 33-2 to 33-4 deliver second through fourth correlation signals representative of the second through the fourth correlation coefficients to the second through the fourth primary complex multipliers 21-2 to 21-4, respectively. The second through the fourth correlation coefficients are equivalent to the second through the fourth tap coefficients $W_0$, $W_1$, and $W_2$, respectively.

In general, the tap coefficient correction based on the correlation method is carried out in each of the reception symbols in accordance with a second equation (2) given by:

$$W_i = \int \bar{a}^t u_i^{t*} dt / \Delta, \tag{2}$$

where $\bar{a}^t$ represents a signal value of the decision signal at a certain time instant t, $u_i^{t*}$ represents a complex conjugate, at the time instant t, of an i-th secondary delayed signal supplied to an i-th correlator, and $\Delta$ represents a band width equal to three decibels in each of the correlators.

In the meanwhile, the correction coefficient $\mu$ described in conjunction with FIG. 1 is defined by a third equation (3) as follows;

$$\mu = 2\pi \Delta T. \tag{3}$$

As apparent from the third equation (3), the correction coefficient $\mu$ increases in proportion to increment of the band width $\Delta$. In this event, although an adaptive convergence speed becomes more faster, fluctuation of the tap coefficient becomes large because a correction value of the tap coefficient becomes large. On the contrary, decrement of the band width Δ is equivalent to decrement of the correction coefficient $\mu$. In this event, although the adaptive convergence speed slow down, the fluctuation of the tap coefficient becomes small because the correction value of the tap coefficient becomes small.

As apparent from the first equation (1), a change value of the tap coefficient in each of the reception symbols is in proportion to the correction coefficient $\mu$. Accordingly, if the correction coefficient $\mu$ becomes large, the charge value of the tap coefficient increases. This means that the matched filter tracks a change of the transmission impulse response by a large step size. As a result, a tracking error becomes large. With regard to estimation of the tracking error, it is disclosed in "ADAPTIVE SIGNAL PROCESSING" which is written by Bernard Widrow in Stanford University, who is an advocate of the LMS algorithm, and by Samuel D. Stearns in Sandia National Laboratories and which is issued by Prentice-Hall, Inc.

In the adaptive filter, a theoretical value $E_O$ of a least square mean value in the error signal is calculated by the use of a normal equation of Wiener Hopf. If the least square mean value in the error signal corrected by the LMS algorithm is given by $E_{min}$, a misadjustment M is defined by a fourth equation (4) given by:

$$M = (E_O - E_{min})/E_O. \quad (4)$$

Furthermore, the misadjustment M is defined, by Bernard Widrow, by a fifth equation (5) given by:

$$M = \mu \sum_{N=0}^{L} \lambda_N = \mu \cdot t_r[R], \quad (5)$$

where N represents the number of the taps numbered from zeroth through L, $\lambda_N$ represents an eigen or characteristic value of a correlation matrix R in an N-th tap, and $t_r[R]$ represents a trace (a sum of autocorrelation coefficients) of the correlation matrix R. L represents a positive integer greater than unity.

As obvious from the fifth equation (5), the misadjustment M is in proportion to the correction coefficient $\mu$. This means that a residual error power increases when the correction coefficient $\mu$ increases.

In the matched filters illustrated in FIGS. 1 and 2, it is desirable that the correction coefficient $\mu$ is subjected to decrease to the level which is capable of tracking the change speed (doppler speed) of the transmission impulse response in order to minimize the misadjustment M. However, if the correction coefficient $\mu$ is subjected to decrease, the matched filter is difficult to track a local beat frequency which is a frequency difference between a transmission local frequency and a reception local frequency. This means that the matched filter loses carrier recovery function. In the transmission channel which requires a severe transmission quality, it is inevitable to increase the correction coefficient $\mu$ because the matched filter needs the carrier recovery function which is superior to a phase lock loop circuit known in the art. Furthermore, it is required to increase the correction coefficient $\mu$ because a learning time of the matched filter becomes long as the transmission symbol rate becomes low. In this event, it is inevitable to have a great influence by the misadjustment M.

This phenomenon causes physically the tap coefficients to fluctuate by the step size determined by the correction coefficient $\mu$ and serves as a tap coefficient tracking error noise. Such a noise causes a bit error rate characteristic to degrade independent of a receiver noise and is called a background noise.

For the reason mentioned above, the adaptive receivers illustrated in FIGS. 1 and 2 have a common disadvantage that the adaptive receivers become hard to achieve both of matched filtering function and carrier recovery function as the transmission symbol rate becomes low.

Figure 3:
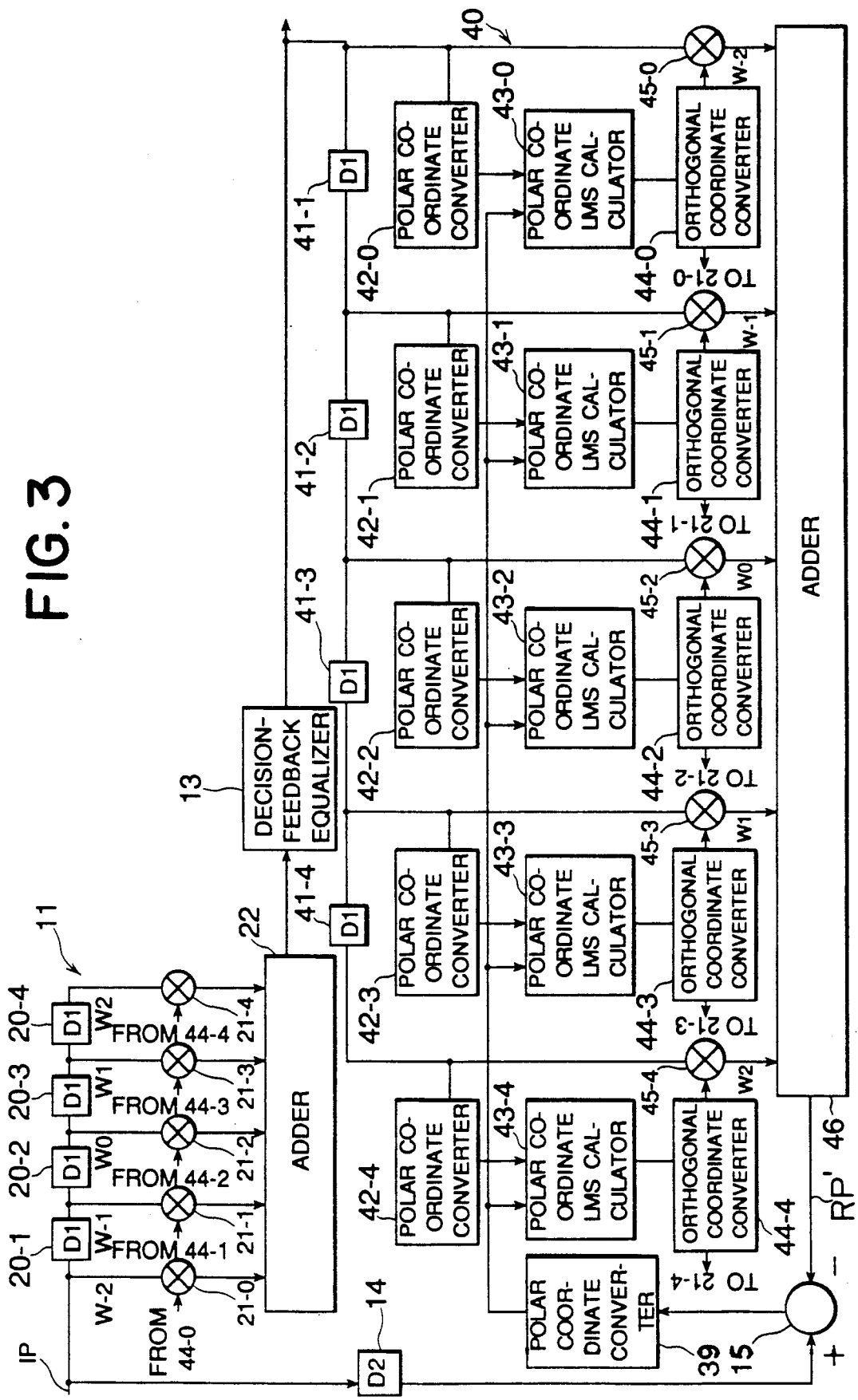
FIG. 3 shows a block diagram of an adaptive receiver according to a first embodiment of this invention.

Referring to FIG. 3, the description will be made as regards an adaptive receiver according to a first embodiment of this invention. The adaptive receiver is of the type which utilizes the MMSE method and is similar to that illustrated in FIG. 1 except that a polar coordinate converter 39 is utilized and that an improved type of a secondary transversal filter 40 is utilized in place of the secondary transversal filter 12.

The adaptive receiver receives the input signal IP through the transmission channel. The primary transversal filter 11 filters the input signal IP into the primary filtered signal in accordance with the zeroth through the fourth tap coefficients $W_{-2}$ to $W_2$. The decision-feedback equalizer 13 carries out the equalization operation in response to the primary filtered signal and produces the equalized signal as the decision signal. The decision signal is supplied to the secondary transversal filter 40.

As described in conjunction with FIG. 1, the secondary transversal filter 40 is for estimating the impulse response of the transmission channel by the use of the decision signal and the error signal. In other words, the secondary transversal filter 40 minimizes the mean square value of the error signal. The secondary transversal filter 40 produces a replica signal RP', as a secondary filtered signal, representative of the replica of the input signal IP. Therefore, the secondary transversal filter 40 may also be called the replica filter or a processing unit.

The input delay circuit 14 gives the second delay D2 to the input signal IP and delivers the delayed input signal having the second delay D2 to the difference calculator 15. The difference calculator 15 is further supplied with the replica signal RP' from the secondary transversal filter 40. The difference calculator 15 calculates the difference between the delayed input signal and the replica signal RP' and produces the difference signal representative of the difference. The difference signal is supplied to the polar coordinate converter 39. It is to be noted here that the difference signal is defined by orthogonal coordinates. The polar coordinate converter 39 carries out polar coordinate conversion to convert the difference signal into a converted difference signal defined by polar coordinates. The converted difference signal is supplied to the secondary transversal filter 40 as the error signal.

The secondary transversal filter 40 comprises a plurality of secondary delay circuits which are equal, in number, to the primary delay circuits in the primary transversal filter 11. Therefore, first through fourth secondary delay circuits 41-1, 41-2, 41-3, and 41-4 are illustrated. The secondary transversal filter 40 further comprises zeroth through fourth polar coordinate converters 42-0, 42-1, 42-2, 42-3, and 42-4, zeroth through fourth polar coordinate LMS calculators 43-0, 43-1, 43-2, 43-3, and 43-4, zeroth through fourth orthogonal coordinate converters 44-0, 44-1, 44-2, 44-3, and 44-4, zeroth through fourth complex multipliers 45-0, 45-1, 45-2, 45-3, and 45-4, and a secondary adder 46.

Each of the first through the fourth secondary delay circuits 25-1 to 25-4 gives the first delay D1 to a signal supplied thereto. The first through the fourth secondary delay circuits 41-1 to 41-4 successively supply first through fourth secondary delayed signals to the first through the fourth secondary complex multipliers 45-1 to 45-4, respectively. The first through the fourth secondary delayed signals have the first through the fourth delays D1, 2D1, 3D1, and 4D1, respectively, and may be called first through fourth delayed decision signals. The zeroth secondary complex multiplier 45-0 is directly supplied with the decision signal. Let a second secondary delayed signal be represented by $â_t$ at the certain time instant t. The third and the fourth secondary delayed signals are represented by $â_{t-1}$ and $â_{t-2}$, respectively, while the first secondary delayed signal and the decision signal are represented by $â_{t+1}$ and $â_{t+2}$, respectively. The first through the fourth secondary delay circuits 41-1 to 41-4 may collectively be called a delay unit.

The decision signal and the first through the fourth secondary delayed signals are defined by the orthogonal coordinates and are supplied to the zeroth through the fourth polar coordinate converters 42-0 to 42-4, respectively. As the same with the polar coordinate converter 39, the zeroth through the fourth polar coordinate converters 42-0 to 42-4 convert the decision signal and the first through the fourth secondary delayed signals into zeroth through fourth converted decision signals, respectively, which are defined by the polar coordinates. The zeroth through the fourth converted decision signals are supplied to the zeroth through the fourth polar coordinate LMS calculators 43-0 to 43-4, respectively. The polar coordinate converter 39 and the zeroth through the fourth polar coordinate converters 42-0 to 42-4 can be implemented by an ROM (read only memory) according to an ROM table method known in the art. The zeroth through the fourth polar coordinate converters 42-0 to 42-4 may collectively be called a polar coordinate converting unit.

Each of the zeroth through the fourth polar coordinate LMS calculators 43-0 to 43-4 is for carrying out the LMS calculation on the polar coordinate. In other words, each of the zeroth through the fourth polar coordinate LMS calculators 43-0 to 43-4 carries out the tap coefficient correction. For example, the zeroth polar coordinate LMS calculator 43-0 carries out the tap coefficient correction by the use of the zeroth converted decision signal and the error signal both of which are defined by the polar coordinates and produces a zeroth calculated signal representative of the zeroth tap coefficient $W_{-2}$. Similarly, the first polar coordinate LMS calculator 43-1 carries out the tap coefficient correction by the use of the first converted decision signal and the error signal and produces a first calculated signal representative of the first tap coefficient $W_{-1}$. Likewise, the second through the third polar coordinate LMS calculators 43-2 to 43-4 produce second through fourth calculated signals representative of the second through the fourth tap coefficients $W_0$, $W_1$, and $W_2$, respectively. The zeroth through the fourth calculated signals are defined by the polar coordinates. The zeroth through the fourth polar coordinate LMS calculators 43-0 to 43-4 may collectively be called a calculating unit.

As a result of the tap coefficient correction mentioned above, the zeroth through the fourth calculated signals are supplied to the zeroth through the fourth orthogonal coordinate converters 44-0 to 44-4, respectively. Each of the zeroth through the fourth orthogonal coordinate converters 44-0 to 44-4 is for carrying out orthogonal coordinate conversion to convert each of the zeroth through the fourth calculated signals defined by the polar coordinates into each of zeroth through fourth converted orthogonal signals defined by the orthogonal coordinates. The zeroth through the fourth converted orthogonal signals are supplied to the zeroth through the fourth secondary complex multipliers 45-0 to 45-4 as the zeroth through the fourth tap coefficient signals, respectively. The zeroth through the fourth converted orthogonal signals are further supplied to the zeroth through the fourth primary complex multipliers 21-0 to 21-4, respectively. The zeroth through the fourth orthogonal coordinate converters 44-0 to 44-4 may collectively be called an orthogonal coordinate converting unit.

Supplied with the decision signal and the zeroth tap coefficient signal both of which are defined by the orthogonal coordinates, the zeroth secondary complex multiplier 45-0 multiplies the decision signal by the zeroth tap coefficient signal and produces a zeroth secondary multiplied signal. The first secondary complex multiplier 45-1 is supplied with the first secondary delayed signal and the first tap coefficient signal both of which are defined by the orthogonal coordinates and multiplies the first secondary delayed signal by the first tap coefficient signal to produce a first secondary multiplied signal. Likewise, the second through the fourth secondary complex multipliers 45-2 to 45-4 multiply the second through the fourth secondary delayed signals by the second through the fourth tap coefficient signals, respectively, and produce second through fourth secondary multiplied signals. The zeroth through the fourth secondary complex multipliers 45-0 to 45-4 may collectively be called a complex multiplier unit. The zeroth through the fourth secondary multiplied signals are supplied to the secondary adder 46. The secondary adder 46 calculates a secondary total sum of the zeroth through the fourth secondary multiplied signals and delivers a secondary sum signal representative of the secondary total sum to the difference calculator 15 as the replica signal RP'.

Figure 4:
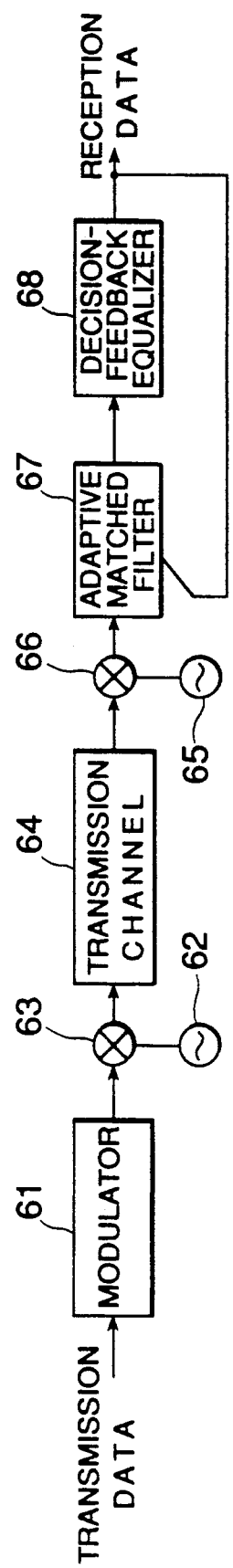
FIG. 4 shows a block diagram of a transmission channel model to which this invention is applicable.

Turning to FIG. 4, description will proceed to a transmission channel model including the adaptive receiver illustrated in FIG. 3. In the transmission channel model, a transmission side comprises a modulator 61 supplied with transmission data, a transmission local oscillator 62 for generating a transmission local frequency, namely, a transmission carrier frequency, and a transmission frequency converter 63 for carrying out frequency conversion by the use of the transmission local frequency. Generally, the modulator 61 carries out PSK (phase shift keying) modulation or QAM (quadrature amplitude modulation) and produces a modulated signal having a transmission intermediate frequency. The frequency converter 63 converts the transmission intermediate frequency of the modulated signal into the transmission local frequency. The modulated signal having the transmission local frequency is transmitted from a transmitter (not shown) as a transmission signal through a transmission channel 64.

A reception side of the transmission channel model comprises a reception local oscillator 65 for generating a reception local frequency, a reception frequency converter 66 for carrying out frequency conversion by the use of the reception local frequency, an adaptive matched filter 67, and a decision-feedback equalizer 68. It is to be noted here that a combination of the adaptive matched filter 67 and the decision-feedback equalizer 68 is equivalent to the adaptive receiver 40 illustrated in FIG. 3. The transmission signal is received by an antenna (not shown) as a reception signal. The reception frequency converter 66 converts the transmission local frequency of the reception signal into the reception local frequency, namely, a reception intermediate frequency, and produces a converted reception signal. Supplied with the converted reception signal, the adaptive matched filter 67 estimates the impulse response of the transmission channel 64 and calculates the complex conjugate of the time reversal impulse response.

In FIG. 5, the impulse response of the transmission channel 64 (FIG. 4) consists of a real part $h_R(t)$ illustrated by a real line and an imaginary part $h_I(t)$ shown by a dotted line. At a first time instant $t=-T/2$, a sample value of the impulse response is shown by a first vector $h_{-1}$ positioned at a first position on a complex plane as illustrated in FIG. 6(a). At a second time instant $t=0$, the sample value of the impulse response is shown by a second vector $h_0$ positioned at a second position on the complex plane as illustrated in FIG. 6(b). At a third time instant $t=T/2$, the sample value of the impulse response is shown by a third vector $h_{+1}$ positioned at a third position as illustrated in FIG. 6(c). After a lapse of a certain time duration, the first through the third vectors $h_{-1}$, $h_0$, and, $h_{+1}$ shift to fourth through sixth positions, respectively, on the complex plane as shown in FIGS. 6(d), 6(e), and 6(f). Inasmuch as the impulse response shown in FIG. 5 is inherent in the transmission channel 64, relative relation between an amplitude and a phase of each of the first through the third vectors is determined by the characteristic of the transmission channel 64.

In FIG. 4, a frequency difference exists between the transmission local frequency generated by the transmission local oscillator 62 and the reception local frequency generated by the reception local oscillator 65. Such a frequency difference is called a local beat frequency. In this event, if the impulse response is defined in an output of the reception frequency converter 66, it is equivalent to multiply the impulse response of the transmission channel 64 by the local beat frequency. This means that the first through the third vectors carry out phase rotation in the same direction at the same rotation speed as illustrated in FIGS. 6(a) to 6(c). If both of the transmission and the reception local oscillators 62 and 65 have normal frequency stability and if the transmission and the reception local frequencies are equal to about two Giga Hertz, the local beat frequency becomes equal to several hundred Hertz. On the other hand, a fading change or variation speed (doppler speed) becomes equal to several Hertz in a two Giga Hertz band. Inasmuch as the local beat frequency is higher than the doppler speed, after a lapse of the certain time duration, the first vector $h_{-1}$ rotates from the first position to the fourth position illustrated in FIG. 6(c) with keeping the relative relation of the impulse response determined in FIG. 6(a). The second vector $h_0$ rotates from the second position to the fifth position illustrated in FIG. 6(e) with keeping the relative relation of the impulse response determined in FIG. 6(b). Similarly, the third vector $h_{+1}$ rotates from the third position to the sixth position illustrated in FIG. 6(f) with keeping the relative relation of the impulse response determined in FIG. 6(c).

Under the circumstances, in the estimation of the impulse response according to the conventional MMSE method and the conventional correlation method both of which are described in conjunction with FIGS. 1 and 2, the correction coefficient $\mu$ and the correlation band width $\Delta$ are determined at a large value which is capable of tracking the local beat frequency.

Furthermore, a correlation calculation of the LMS algorithm given by the above-mentioned first equation (1) is a complex calculation on an orthogonal coordinate system. In the LMS algorithm given by the first equation (1), the tap correction is carried out in each of the real part and the imaginary part in accordance with sixth and seventh equations (6) and (7) give by:

$$W_{Ri}^{t+1} = W_{Ri}^t - \mu_i(\epsilon_R^t \hat{a}_{Ri}^t + \epsilon_I^t \hat{a}_{Ii}^t), \quad (6)$$

$$W_{Ii}^{t+1} = W_{Ii}^t - \mu_i(\epsilon_I^t \hat{a}_{Ri}^t + \epsilon_R^t \hat{a}_{Ii}^t), \quad (7)$$

where $W_{Ri}^{t+1}$ represents the real part of an i-th tap coefficient at the time instant $(t+1)$, $W_{Ii}^{t+1}$ represents the imaginary part of the i-th tap coefficient at the time instant $(t+1)$, $\mu_i$ represents an i-th correction coefficient corresponding to the i-th tap coefficient, $\epsilon_R$ represents the real part of the error signal, $\epsilon_I$ represents the imaginary part of the error signal, $\hat{a}_{Ri}$ represents the real part of the decision signal given by an i-th tap of the secondary transversal filter 40, and $\hat{a}_{Ii}$ represents the imaginary part of the decision signal given by the i-th tap of the secondary transversal filter 40.

As described in conjunction with FIG. 3, the polar coordinate conversion is applied to the sixth and the seventh equations (6) and (7). In order to carry out variable conversion, eighth through tenth equations (8), (9), (10) are substituted for the sixth and the seventh equations (6) and (7).

$$W_{Ri}^t \triangleq r_i^t \cos \phi_i^t, \quad W_{Ii}^t \triangleq r_i^t \sin \phi_i^t, \quad (8)$$

where $r_i$ and $\phi_i$ represent an amplitude and a phase angle, respectively, of the i-th tap coefficient.

$$\epsilon_R^t \triangleq Z^t \cos \alpha^t, \quad \epsilon_I^t \triangleq Z^t \sin \alpha^t, \quad (9)$$

where $Z$ and $\alpha$ represent an amplitude and a phase angle, respectively, of the error signal.

$$\hat{a}_{Ri}^t \triangleq a_i^t \cos \beta_i^t, \quad \hat{a}_{Ii}^t \triangleq a_i^t \sin \beta_i^t, \quad (10)$$

where $\beta_i$ represents a phase angle of the decision signal given by the i-th tap of the secondary transversal filter 40.

As a result of coordination of the above-mentioned equations by using an eleventh equation (11), twelfth and thirteenth equations (12) and (13) can be obtained.

$$E_i^t \triangleq \alpha^t - \beta_i^t, \quad (11)$$

$$r_i^{t+1} \cos \phi_i^{t+1} = r_i^t \cos \phi_i^t - \mu_i Z^t a_i^t \cos E_i^t. \quad (12)$$

$$r_i^{t+1} \sin \phi_i^{t+1} = r_i^t \sin \phi_i^t - \mu_i Z^t a_i^t \sin E_i^t. \quad (13)$$

Next, a sum of the square of the twelfth equation (12) and the square of the thirteenth equation (13) is calculated. As a result, a fourteenth equation (14) can be obtained.

$$(r_i^{t+1})^2 = (r_i^t)^2 - 2\mu_i r_i^t Z^t a_i^t \cos(\phi_i^t - E_i^t) + (\mu_i Z^t a_i^t)^2. \quad (14)$$

In this event, since the i-th correction coefficient $\mu_i$ is set at a very small value smaller than unity, an inequality (15) is formed as a fifteenth equation and the fourteenth equation (14) can be replaced by an approximate expression (16) as a sixteenth equation.

$$(\mu_i Z^t a_i^t)^2 << (\mu_i Z^t a_i^t). \quad (15)$$

$$(r_i^{t+1})^2 \approx (r_i^t)^2 - 2\mu_i r_i^t Z^t a_i^t \cos(\phi_i^t - E_i^t). \quad (16)$$

In addition, the amplitude $r_i^{t+1}$ can be defined by a seventeenth equation (17) given by:

$$r_i^{t+1} \triangleq r_i^t + \delta_r, \quad (17)$$

where $\delta_r$ represents a variation of the amplitude.

When a left side member of the sixteenth equation (16) is partially differentiated by $r_i^t$ by the use of the seventeenth equation (17), an eighteenth equation (18) can be obtained.

$$\frac{\partial(r_i^{t+1})^2}{\partial r_i^t} = 2r_i^{t+1} \frac{\partial}{\partial r_i^t}(r_i^t + \delta r) = 2r_i^{t+1} \quad (18)$$

Accordingly, when the sixteenth equation (16) is partially differentiated by $r_i^t$, a nineteenth equation (19) can be obtained.

$$r_i^{t+1} = r_i^t - \mu_i Z^t a_i^t \cos(\phi_i^t - E_i^t). \quad (19)$$

The nineteenth equation (19) is a correction equation related to an amplitude term of the i-th tap coefficient in the secondary transversal filter 40 illustrated in FIG. 3.

Next, when a ratio between the twelfth and the thirteenth equations (12) and (13) is calculated, a twentieth equation (20) is obtained.

$$\tan\phi_i^{t+1} = \frac{r_i^t \sin\phi_i^t - \mu_i Z^t a_i^t \sin E_i^t}{r_i^t \cos\phi_i^t - \mu_i Z^t a_i^t \cos E_i^t} \quad (20)$$

$$= \frac{\tan\phi_i^t - \mu_i Z^t a_i^t \sin E_i^t / r_i^t \cos\phi_i^t}{1 - \mu_i Z^t a_i^t \cos E_i^t / r_i^t \cos\phi_i^t}.$$

In the twentieth equation (20), a second term of a denominator is greatly smaller than unity. Accordingly, the twentieth equation (20) can be replaced by an approximate expression (21) as a twenty-first equation.

$$\tan\phi_i^{t+1} = \tan\phi_i^t - v_i z^t a_i^t \sin E_i^t / r_i^t \cos\phi_i^t, \quad (21)$$

where $v_i$ represents the correction coefficient related to the amplitude term of the i-th tap in the secondary transversal filter 40 and is distinguished, in step size, from the correction coefficient $\mu_i$ related to the phase term.

The twenty-first equation (21) is a correction equation related to a phase term of the i-th tap coefficient in the secondary transversal filter 40. Namely, the complex LMS algorithm on the orthogonal coordinates is represented, as the complex LMS algorithm on the polar coordinates, by twenty-second and twenty-third equations (22) and (23).

$$r_i^{t+1} = r_i^t - v_i z^t a_i^t \cos(\phi_i^t - E_i^t). \quad (22)$$

$$\tan\phi_i^{t+1} = \tan\phi_i^t - \mu_i Z^t a_i^t \sin E_i^t / r_i^t \cos\phi_i^t. \quad (23)$$

When the tap correction is carried out in accordance with the polar coordinate LMS algorithm, the misadjustment Mp can be represented by a twenty-fourth equation (24) like the fifth equation (5).

$$Mp = \sum_{i=-(N-1)/2}^{(N-1)/2} v_i \cdot \lambda_i^a + \sum_{i=-(N-1)/2}^{(N-1)/2} \mu_i \cdot \lambda_i^p, \quad (24)$$

where $\lambda^a_i$ represents the eigen value of the correlation matrix related to an amplitude variation of the i-th tap, $\lambda^p_i$ represents the eigen value of the correlation matrix related to a phase variation of the i-th tap.

On the other hand, if the misadjustment M given by the fifth equation (5) is represented by the real part and the imaginary part in the orthogonal coordinate system, a twenty-fifth equation (25) can be obtained.

$$Mo = \sum_{i=-(N-1)/2}^{(N-1)/2} \mu_i \cdot \lambda_i^R + \sum_{i=-(N-1)/2}^{(N-1)/2} \mu_i \cdot \lambda_i^I, \quad (25)$$

where $\lambda^R_i$ represents the eigen value of the correlation matrix related to a real variation of the i-th tap, $\lambda^I_i$ represents the eigen value of the correlation matrix related to an imaginary variation of the i-th tap.

In the equation (24) which represents the misadjustment $M_p$ in the polar coordinate LMS algorithm, if the correction coefficients $v_i$ and $\mu_i$ are set so as to form a twenty-sixth equation (26), a twenty-seventh equation (27) is derived from the twenty-fourth and the twenty-fifth equations (24) and (25).

$$v_i << u_i. \quad (26)$$

$$M_p << M_o. \quad (27)$$

In the complex LMS algorithm of the orthogonal coordinate system, it is impossible to give the difference of the step size to the correction coefficients related to a real axis and an imaginary axis. In the polar coordinate LMS algorithm, however, it is possible to give the difference to the correction coefficients related to an amplitude axis and a phase axis. In this event, with regard to the phase axis, the step size is set at the size which is equal to that of the correction coefficient $\mu$ in the orthogonal coordinate, so that it is possible to control the local beat frequency. With regard to the amplitude axis, since the correction coefficient v can be set at a small value which is able to track the doppler speed of the fading, so that the misadjustment of the amplitude axis can be reduced. Thus, the adaptive receiver according to the first embodiment of this invention can reduce the tap coefficient tracking error noise, namely, the background noise, relative to the conventional adaptive receiver illustrated in FIG. 1.

Figure 7:
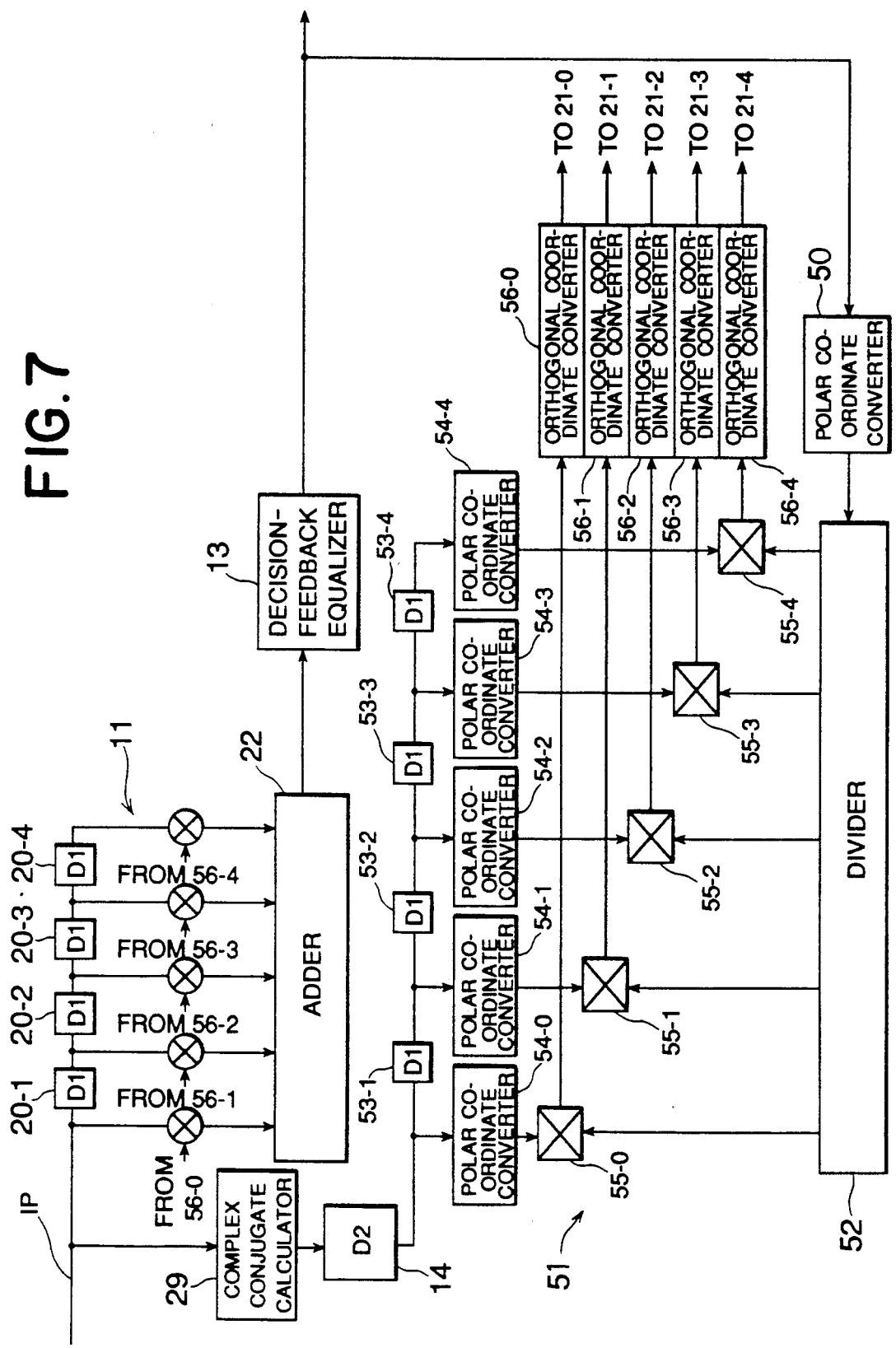
FIG. 7 shows a block diagram of an adaptive receiver according to a second embodiment of this invention.

Referring to FIG. 7, the description will be made as regards an adaptive receiver according to a second embodiment of this invention. The adaptive receiver is of the type which utilizes the correlation method and is similar to that illustrated in FIG. 2 except that a polar coordinate converter 50 is utilized and that an improved type of a secondary transversal filter 51 is utilized in place of the secondary transversal filter 30 illustrated in FIG. 2. Therefore, the description concerning the primary transversal filter 11 is omitted.

The complex conjugate calculator 29 calculates the complex conjugate of the input signal IP and delivers the calculated input signal representative of the complex conjugate to the input delay circuit 14. The input delay circuit 14 gives the second delay D2 to the calculated input signal and supplies the delayed input signal to the secondary transversal filter 51. The delayed input signal is defined by the orthogonal coordinates. On the other hand, the polar coordinate converter 50 is supplied with the decision signal delivered from the decision-feedback equalizer 13. The decision signal is also defined by the orthogonal coordinates. The polar coordinate converter 50 carries out the polar coordinate conversion to convert the decision signal into a converted decision signal defined by the polar coordinates. The polar coordinate converter 50 may be called a decision signal converting circuit.

The secondary transversal filter 51 is for obtaining the complex conjugate of a time reversal impulse response of the transmission channel by carrying out the polar coordinate LMS calculation. For this purpose, the secondary transversal filter 51 comprises a divider 52, first through fourth secondary delay circuits 53-1, 53-2, 53-3, and 53-4, and zeroth through fourth polar coordinate converters 54-0, 54-1, 54-2, 54-3, and 54-4, zeroth through fourth correlators 55-0, 55-1, 55-2, 55-3, and 55-4, and zeroth through fourth orthogonal coordinate converters 56-0, 56-1, 56-2, 56-3, and 56-4. The secondary transversal filter 51 may be called a processing unit.

Each of the first through the fourth secondary delay circuits 53-1 to 53-4 gives the first delay D1 to a signal supplied thereto. The first through the fourth secondary delay circuits 53-1 to 53-4 successively supply first through fourth secondary delayed signals to the first through the fourth polar coordinate converters 54-1 to 54-4, respectively. The zeroth polar coordinate converter 54-0 is directly supplied with the delayed input signal. It is to be noted here that the first through the fourth secondary delayed signals are defined by the orthogonal coordinates. The zeroth through the fourth polar coordinate converters 54-0 to 54-4 carry out the polar coordinate conversion to convert the delayed input signal and the first through the fourth secondary delayed signals into zeroth through fourth converted signals, respectively. The zeroth through the fourth converted signals are supplied to the zeroth through the fourth correlators 55-0 to 55-4, respectively. The zeroth through the fourth polar coordinate converters 54-1 to 54-4 may collectively be called a polar coordinate converting unit.

The divider 52 divides the converted decision signal delivered from the polar coordinate converter 50 into zeroth through fourth divided signals and supplies the zeroth through the fourth divided signals to the zeroth through the fourth correlators 55-0 to 55-4, respectively.

The zeroth correlator 55-0 is for calculating a zeroth correlation coefficient between the zeroth converted signal and the zeroth divided signal. The zeroth correlation coefficient is equivalent to the zeroth tap coefficient $W_{-2}$ mentioned in conjunction with FIG. 1. The zeroth correlator 55-0 supplies a zeroth correlation signal representative of the zeroth correlation coefficient to the zeroth orthogonal coordinate converter 56-0. Similarly, the first correlator 55-1 calculates a first correlation coefficient between the first secondary delayed signal and the first divided signal and delivers a first correlation signal representative of the first correlation coefficient to the first orthogonal coordinate converter 56-1. The first correlation coefficient is equivalent to the first tap coefficient $W_{-1}$. The second through the fourth correlators 55-2 to 55-4 calculate second through fourth correlation coefficients between the second through the fourth secondary delayed signals and the second through the fourth divided signals, respectively. The second through the fourth correlators 55-2 to 55-4 deliver second through fourth correlation signals representative of the second through the fourth correlation coefficients to the second through the fourth orthogonal coordinate converters 56-2 to 56-4, respectively. The second through the fourth correlation coefficients are equivalent to the second through the fourth tap coefficients $W_0$, $W_1$, and $W_2$, respectively. The zeroth through the fourth correlation signals are defined by the polar coordinates. The zeroth through the fourth correlators 55-0 to 55-4 may collectively be called a correlation unit.

The zeroth through the fourth orthogonal converters 56-0 to 56-4 carry out the orthogonal coordinate conversion to convert the zeroth through the fourth correlation signals into zeroth through fourth converted orthogonal signals. The zeroth through the fourth converted orthogonal signals are defined by the orthogonal coordinates and are supplied to the zeroth through the fourth primary multipliers 21-0 to 21-4 as the zeroth through the fourth tap coefficient signals, respectively.

In the conventional correlation method described in conjunction with FIG. 2, the correlation calculation is carried out by integration operation, namely, analog correlation calculation, as shown in the second equation (2). In the example being illustrated, digital correlation calculation is carried out in order to simplify the polar coordinate LMS calculation. If the correlation calculation given by the second equation (2) is replaced by discrete process, a twenty-eight equation (28) can be obtained.

$$W_i^{j+1} = (W_i^j + \mu_i a_i^j u_i^{j*}) \cdot (1 - \mu_i). \tag{28}$$

As described in conjunction with FIG. 3, the twenty-eighth equation (28) is converted by the variable conversion by the use of twenty-ninth through thirty-second equations (29), (30), (31), and (32) into thirty-third and thirty-fourth equations (33) and (34).

$$W_{Ri}^j \triangleq r_i^j \cos \phi_i^j j, \; W_{Ii}^j \triangleq r_i^j \sin \phi_i^j j, \tag{29}$$

$$u_R^j \triangleq u^j \cos \alpha^j, \; u_I^j \triangleq u^j \sin \alpha^j, \tag{30}$$

$$\hat{a}_{Ri}^j \triangleq a_i^j \cos \beta_i^j, \; \hat{a}_{Ii}^j \triangleq a_i^j \sin \beta_i^j, \tag{31}$$

$$E_i^j \triangleq \alpha^j - \beta_i^j, \tag{32}$$

$$r_i^{j+1} \cos \phi_i^{j+1} = (r_i^j \cos \phi_i^j + \mu_i u^j a_i^j \cos E_i^j) \cdot (1 - \mu_i), \tag{33}$$

$$r_i^{j+1} \sin \phi_i^{j+1} = (r_i^j \sin \phi_i^j + \mu_i u^j a_i^j \sin E_i^j) \cdot (1 - \mu_i). \tag{33}$$

In the thirty-second and the thirty-third equations (32) and (33), $(1 - \mu_i)$ is for compensating leakage effect caused by a low band filter for time meaning of the correlator.

As tap correction equations according to the polar coordinate LMS algorithm in the correlation method, thirty-fifth and thirty-sixth equations (35) and (36) can be derived from the thirty-second and the thirty-third equations (32) and (33).

$$r_i^{l+1} = (r_i^l + v_i u^l a_i^l \cos(\phi_i^l - E_i^l)) \cdot (1 - u_i)^2 \quad (35)$$

$$\tan \phi_i^{l+1} = \tan \phi_i^l - u_i u^l a_i^l \sin E_i^l / r_i^l \cos \phi_i^l \quad (36).$$

The zeroth through the fourth correlators 55-0 to 55-4 carry out the tap correction in accordance with the thirty-fifth and the thirty-sixth equations (35) and (36). For the reason mentioned in conjunction with FIG. 3, it is possible to set the correction coefficient related to the phase axis at a large value and to set the correction coefficient relates to the amplitude axis at a small value. As a result, it is possible to reduce the background noise of the adaptive receiver.

While this invention has thus far been described in conjunction with a few embodiments thereof, it will readily be possible for those skilled in the art to put this invention into practice in various other manners.

What is claimed is:

1. An adaptive receiver comprising:
a matched filter for filtering an input signal into a primary filtered signal in accordance with a plurality of tap coefficients;
a decision-feedback equalizer connected to said matched filter for producing a decision signal in response to said primary filtered signal;
processing means connected to said decision-feedback equalizer and supplied with an error signal for processing said decision signal by the use of said error signal in accordance with a polar coordinate LMS (least mean square) algorithm to produce a replica signal representative of replica of said input signal and a plurality of tap coefficient signals representative of said plurality of tap coefficients;
an input delay circuit supplied with said input signal for giving a predetermined delay to said input signal to produce a delayed input signal having said predetermined delay;
a difference calculator connected to said input delay circuit and said processing means for calculating a difference between said delayed input signal and said replica signal to produce a difference signal representative of said difference, said difference signal being defined by orthogonal coordinates; and
a difference signal converting circuit connected to said difference calculator for carrying out polar coordinate conversion to convert said difference signal defined by said orthogonal coordinates into a converted difference signal defined by polar coordinates, said converted difference signal being supplied to said processing means as said error signal.

2. An adaptive receiver as claimed in claim 1, said decision signal being defined by said orthogonal coordinates, wherein said processing means comprises:
delaying means connected to said decision-feedback equalizer for delaying said decision signal to produce first through N-th delayed decision signals which have first through N-th delays different from one another, where N represents a positive integer greater than unity;
polar coordinate converting means connected to said decision-feedback equalizer and said delaying means for carrying out polar coordinate conversion to convert said decision signal and said first through said N-th delayed decision signals defined by said orthogonal coordinates into zeroth through N-th converted decision signals, respectively, which are defined by said polar coordinates;
calculating means connected to said difference signal converting circuit and said polar coordinate converting means for carrying out a predetermined calculation related to complex LMS (least mean square) calculation in response to said converted difference signal and said zeroth through said N-th converted decision signals to produce zeroth through N-th calculated signals;
orthogonal coordinate converting means connected to said calculating means for carrying out orthogonal coordinate conversion to convert said zeroth through said N-th calculated signals defined by said polar coordinates into zeroth through N-th converted orthogonal signals, respectively, which are defined by said orthogonal coordinates, said zeroth through said N-th converted orthogonal signals being supplied to said matched filter as said plurality of tap coefficient signals;
complex multiplier means connected to said decision-feedback equalizer, said delaying means, and said orthogonal coordinate converting means for multiplying said decision signal by said zeroth converted orthogonal signal and for multiplying said first through said N-th delayed decision signals by said first through said N-th converted orthogonal signals, respectively, said complex multiplier means producing zeroth through N-th multiplied signals; and
adder means connected to said complex multiplier means for calculating a total sum of said zeroth through said n-th multiplied signals to produce a total sum signal representative of said total sum as said replica signal.

3. An adaptive receiver comprising:
a matched filter for filtering an input signal into a primary filtered signal in accordance with a plurality of tap coefficients;
a decision-feedback equalizer connected to said matched filter for producing a decision signal in response to said primary filtered signal, said decision signal being defined by orthogonal coordinates;
a decision signal converting circuit connected to said decision-feedback equalizer for carrying out polar coordinate conversion to convert said decision signal into a converted decision signal defined by polar coordinates;
a complex conjugate calculator supplied with said input signal for calculating complex conjugate of said input signal to produce a calculated input signal representative of said complex conjugate;
an input delay circuit connected to said complex conjugate calculator for giving a predetermined delay to said calculated input signal to produce a delayed input signal having said predetermined delay, said delayed input signal being defined by said orthogonal coordinates; and
processing means connected to said decision signal converting circuit and said input delay circuit for processing said converted decision signal and said delayed input signal to produce a plurality of tap coefficient signals representative of said plurality of tap coefficients;
said processing means comprising:

dividing means connected to said decision signal converting circuit for dividing said converted decision signal into zeroth through N-th divided signals where N represents a positive integer greater than unity;

delaying means connected to said input delay circuit for delaying said delayed input signal to produce first through N-th delayed signals which have first through N-th delays different from one another;

polar coordinate converting means connected to said input delay circuit and said delaying means for carrying out polar coordinate conversion to convert said delayed input signal and said first through said N-th delayed signals defined by said orthogonal coordinates into zeroth through N-th converted input signals, respectively, which are defined by said polar coordinates;

correlation means connected to said dividing means and said polar coordinate converting means for calculating zeroth through N-th correlation coefficients between said zeroth through said N-th divided signals and said zeroth through said N-th converted input signals, respectively, said correlation means producing zeroth through N-th correlation signals indicative of said zeroth through said N-th correlation coefficients, respectively, said zeroth through said N-th correlation signals being defined by said polar coordinates; and orthogonal coordinate converting means connected to said correlation means for carrying out orthogonal coordinate conversion to convert said zeroth through said N-th correlation signals into zeroth through N-th converted orthogonal signals which are defined by said orthogonal coordinates, said zeroth through said N-th converted orthogonal signals being supplied to said matched filter as said plurality of tap coefficient signals.

* * * * *